(12) United States Patent
Larimer

(10) Patent No.: US 9,326,596 B2
(45) Date of Patent: *May 3, 2016

(54) DEPLOYABLE TABLE FOR A SPARE TIRE ASSEMBLY

(71) Applicant: Dan C. Larimer, Wickenburg, AZ (US)

(72) Inventor: Dan C. Larimer, Wickenburg, AZ (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/701,927

(22) Filed: May 1, 2015

(65) Prior Publication Data

US 2015/0230599 A1     Aug. 20, 2015

Related U.S. Application Data

(63) Continuation-in-part of application No. 14/252,419, filed on Apr. 14, 2014, now Pat. No. 9,049,924.

(60) Provisional application No. 61/812,436, filed on Apr. 16, 2013.

(51) Int. Cl.
| | |
|---|---|
| *A47B 23/00* | (2006.01) |
| *A47B 3/10* | (2006.01) |
| *A47B 3/083* | (2006.01) |
| *A47B 9/20* | (2006.01) |
| *B62D 43/02* | (2006.01) |
| *A47B 3/00* | (2006.01) |
| *A47B 3/08* | (2006.01) |

(52) U.S. Cl.
CPC . *A47B 3/10* (2013.01); *A47B 3/083* (2013.01); *A47B 9/20* (2013.01); *B62D 43/02* (2013.01); *A47B 2003/008* (2013.01); *A47B 2003/0824* (2013.01)

(58) Field of Classification Search
CPC .......... B60N 3/002; B60N 3/00; B62D 43/02; B62D 43/00; B60R 7/00; A47B 3/10; A47B 3/083; A47B 9/20; A47B 2003/008; A47B 2003/0824
USPC ......... 108/44, 45, 152, 46, 47, 13; 224/42.13, 224/42.12, 42.19, 275, 42.24, 42.26, 42.27
See application file for complete search history.

(56) References Cited

U.S. PATENT DOCUMENTS

| | | | | |
|---|---|---|---|---|
| 1,606,954 | A * | 11/1926 | Moen et al. .................... | 224/489 |
| 1,705,184 | A * | 3/1929 | Green ......................... | 224/42.19 |
| 2,856,251 | A * | 10/1958 | Garrison ........................ | 108/44 |
| 5,203,479 | A * | 4/1993 | Lucas ......................... | 224/42.13 |
| 5,386,785 | A * | 2/1995 | Naor ............................... | 108/44 |
| 5,443,018 | A * | 8/1995 | Cromwell ....................... | 108/44 |
| 5,462,211 | A * | 10/1995 | Eversoll ..................... | 224/42.14 |
| 5,669,534 | A * | 9/1997 | Edgerley .................... | 224/42.23 |
| 5,706,991 | A * | 1/1998 | Stewart ........................ | 224/539 |

(Continued)

*Primary Examiner* — Jose V Chen

(57) ABSTRACT

A deployable table for an external spare tire assembly is an apparatus that provides a user with a fold-out shelf while the apparatus is attached to the spare tire assembly or provides the user with a table while the apparatus is detached from the spare tire assembly. The apparatus includes an adapter mount, a dual compression clamp, a central hub, a table frame, a table top, and foldable legs. The adapter mount allows the apparatus to detachably attach to the external spare tire assembly. The central hub is connected normal to the table frame, which is used to support the table top. The table top has a stationary portion and a fold-out portion that is used as the shelf. The foldable legs collapse within the table frame or can extend when the apparatus is used as a table. The dual compression clamp connects the central hub to the adapter mount.

9 Claims, 8 Drawing Sheets

(56) References Cited

U.S. PATENT DOCUMENTS

D450,861 S  *  11/2001  Murdick ........................ D26/7
6,394,001 B1 *  5/2002  Giesey et al. .................. 108/44
7,018,006 B1 *  3/2006  Tezak ........................... 312/114
8,387,839 B2 *  3/2013  Sautter et al. ............. 224/42.13
9,049,924 B2 *  6/2015  Larimer

* cited by examiner

DEPLOYABLE TABLE FOR A SPARE TIRE ASSEMBLY

The current application is a continuation-in-part and claims priority to a non-provisional application Ser. No. 14/252,419 filed on Apr. 14, 2014. The non-provisional application Ser. No. 14/303,569 claims priority to a provisional application 61/812,436 filed on Apr. 16, 2013.

FIELD OF THE INVENTION

The present invention relates generally to automotive accessories. More specifically, the present invention is a spare tire mounted table that may be oriented, leveled, and otherwise adjusted in order to accommodate various uneven terrains.

BACKGROUND OF THE INVENTION

Interior vehicle space is at a premium, particularly in vehicles that utilize spare tire carriers. Due to the limited space available within the interior cabin of a vehicle, it is often difficult to allocate space for large and/or bulky objects such as tables. This is problematic when these objects are required such as for tailgating at sporting events or other outings. Tables used during tailgates and similar activities are typically foldable in order to reduce space although this does not fully rectify the issue. The present invention seeks to provide a solution to the aforementioned issue and provide users with a convenient and practical solution.

The objective of the present invention is to provide users with a readily available and easily deployable table that maintains a low profile when mounted to a vehicle's spare tire. In the deployed configuration of the present invention, the table may be oriented, leveled, and otherwise adjusted to accommodate for any uneven terrain on which the vehicle is resting.

DETAILED DESCRIPTION OF THE INVENTION

All illustrations of the drawings are for the purpose of describing selected versions of the present invention and are not intended to limit the scope of the present invention.

Figure 1:
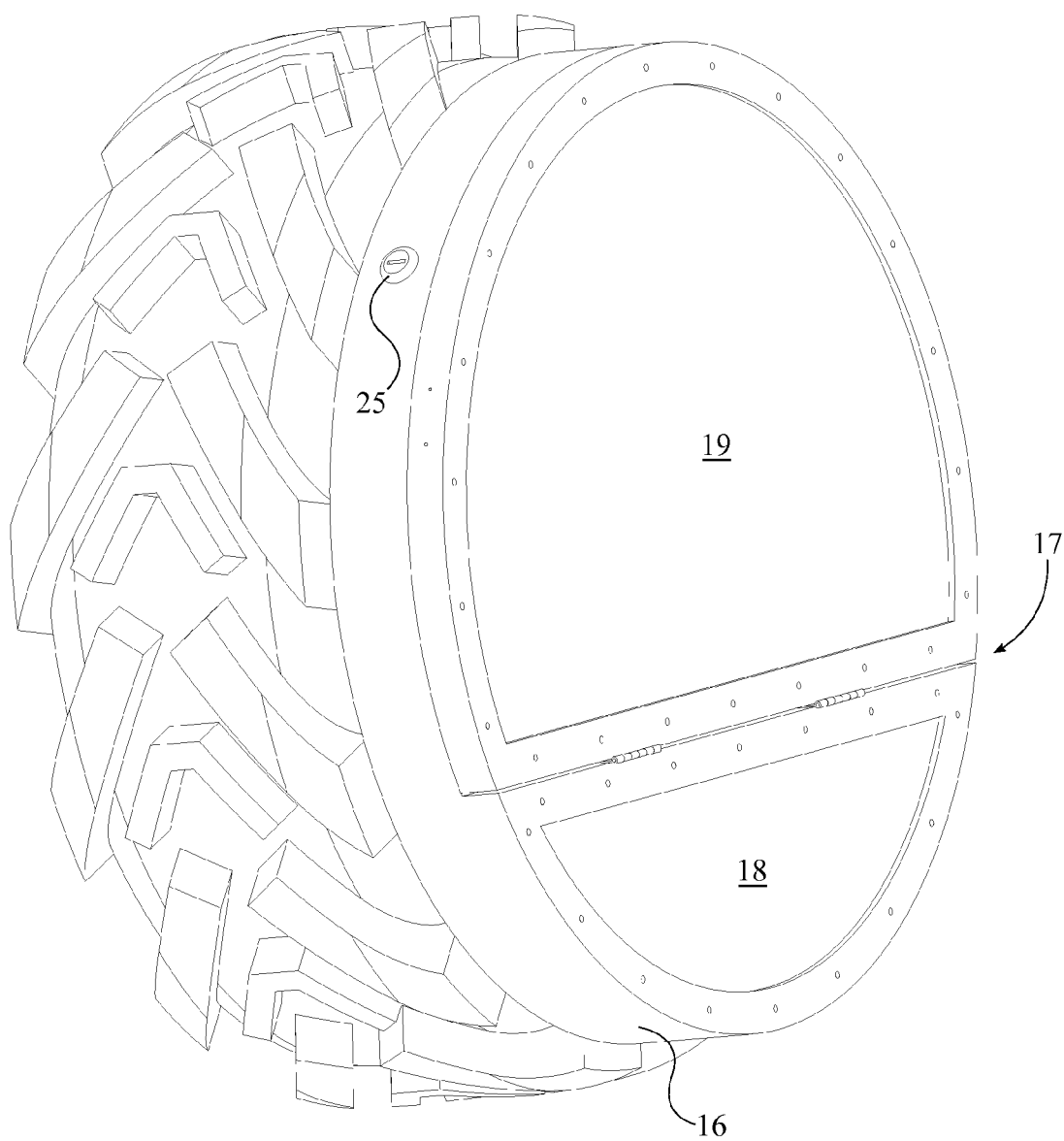
FIG. 1 is a front perspective view of the present invention attached to an external spare tire assembly.
Figure 2:
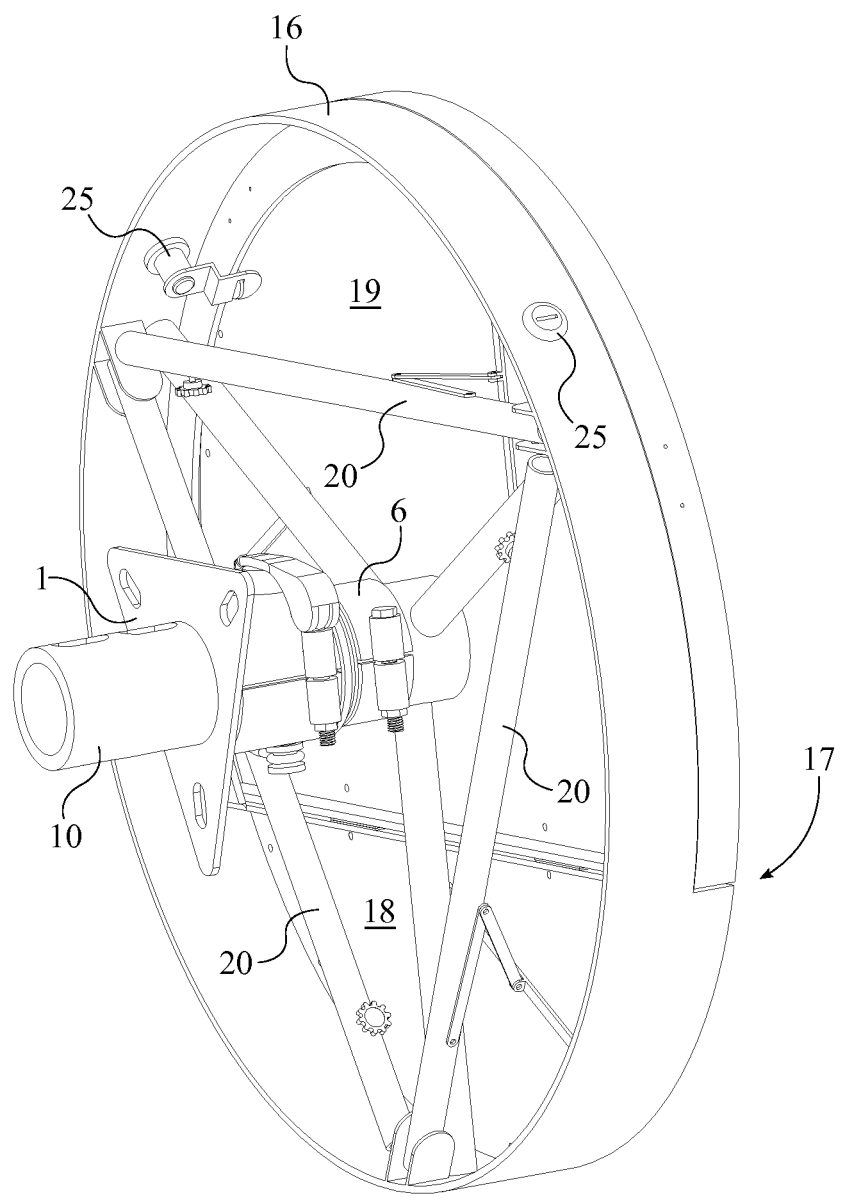
FIG. 2 is a rear perspective view of the present invention shown without the external spare tire assembly.
Figure 3:
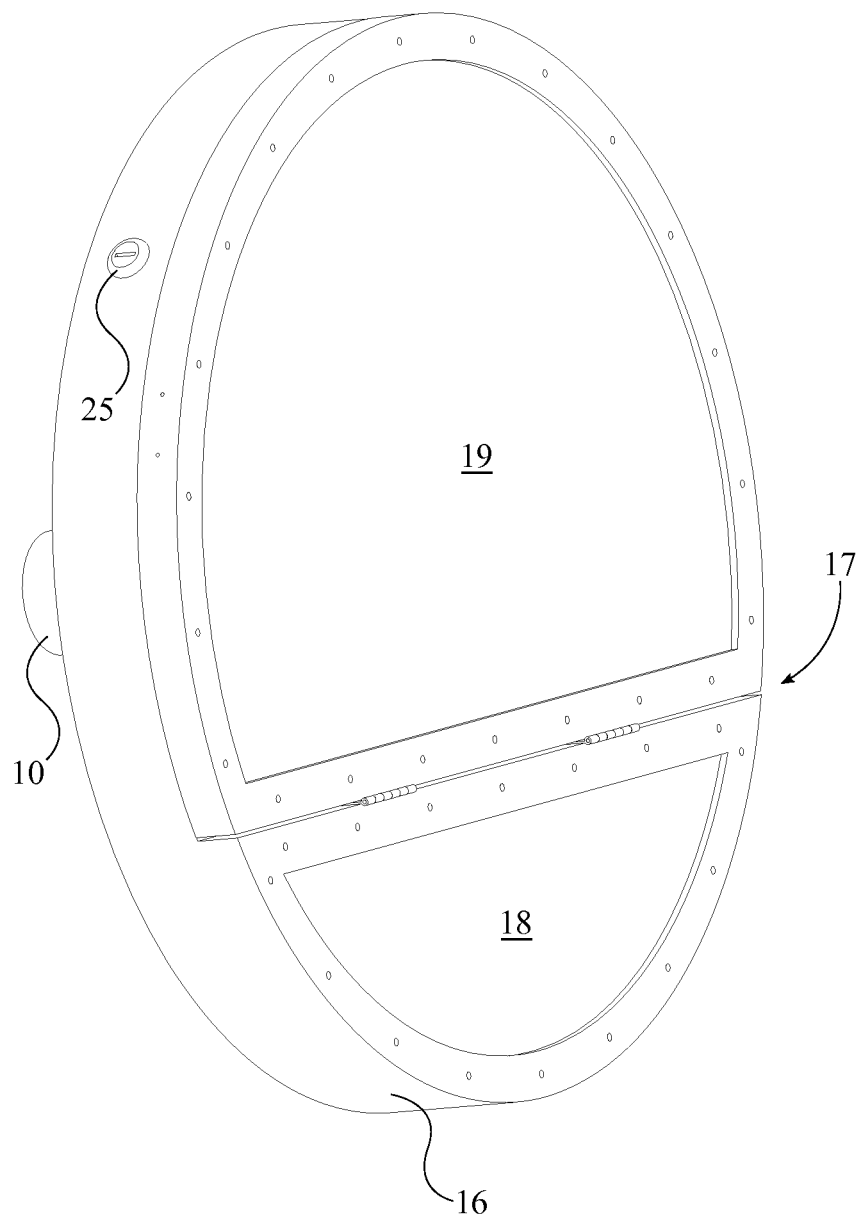
FIG. 3 is a front perspective view of the present invention, wherein the fold-out portion of the table top is parallel to the stationary portion of the table top.
Figure 4:
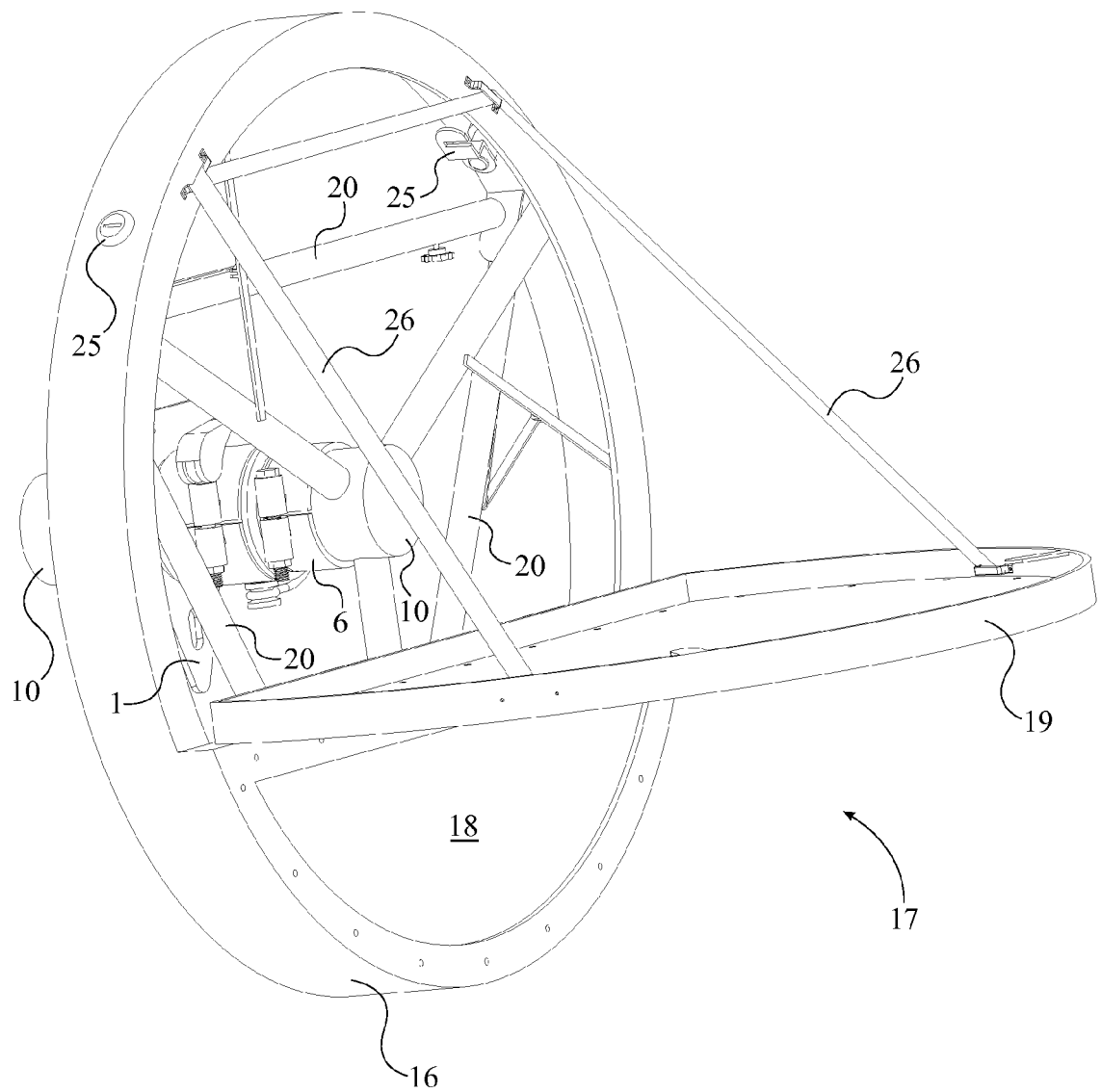
FIG. 4 is a front perspective view of the present invention, wherein the fold-out portion of the table top is perpendicular to the stationary portion of the table top and is being used as a shelf.
Figure 5:
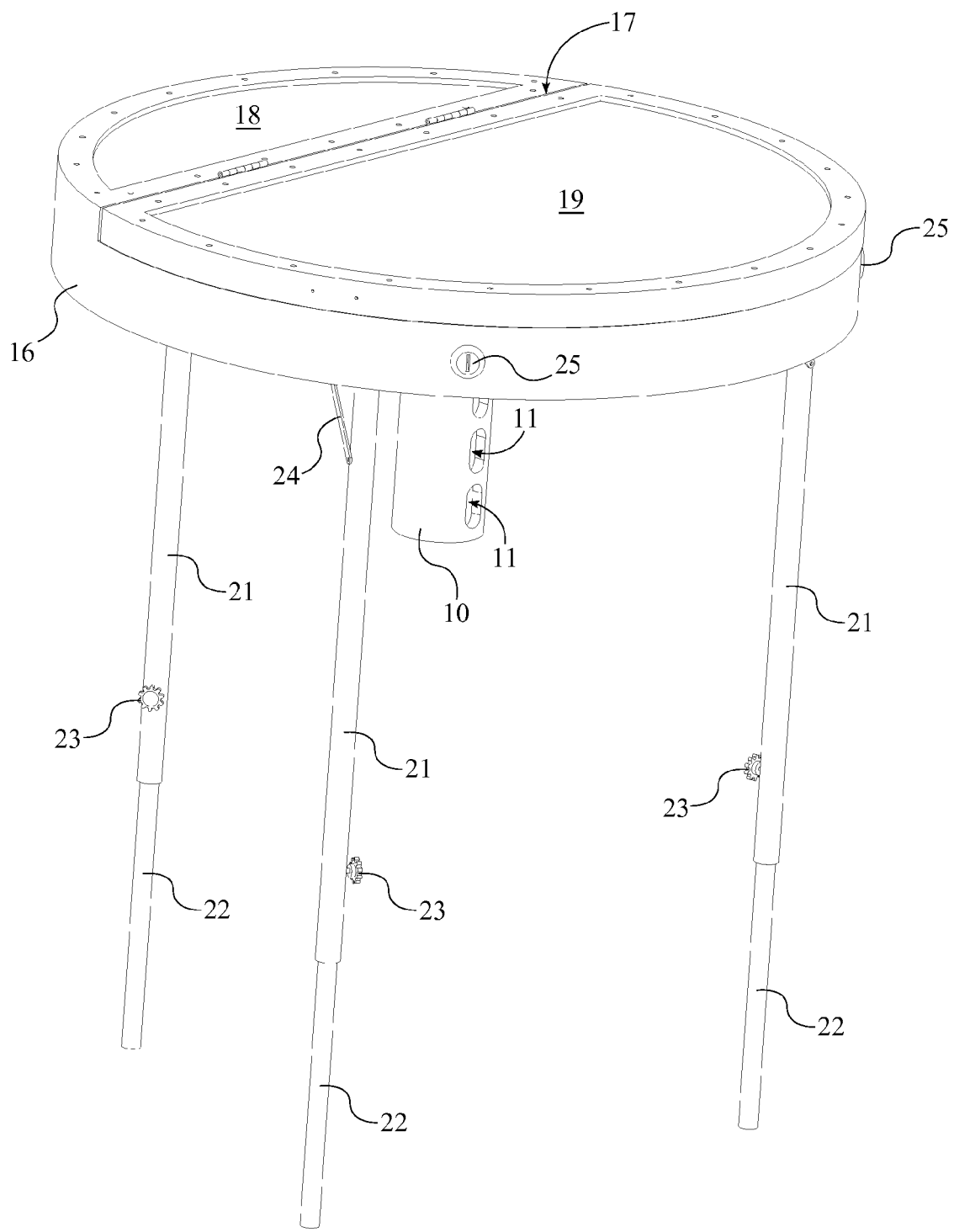
FIG. 5 is a top perspective view of the present invention detached from the external spare tire assembly, wherein the present invention is being used as a deployable table.
Figure 6:
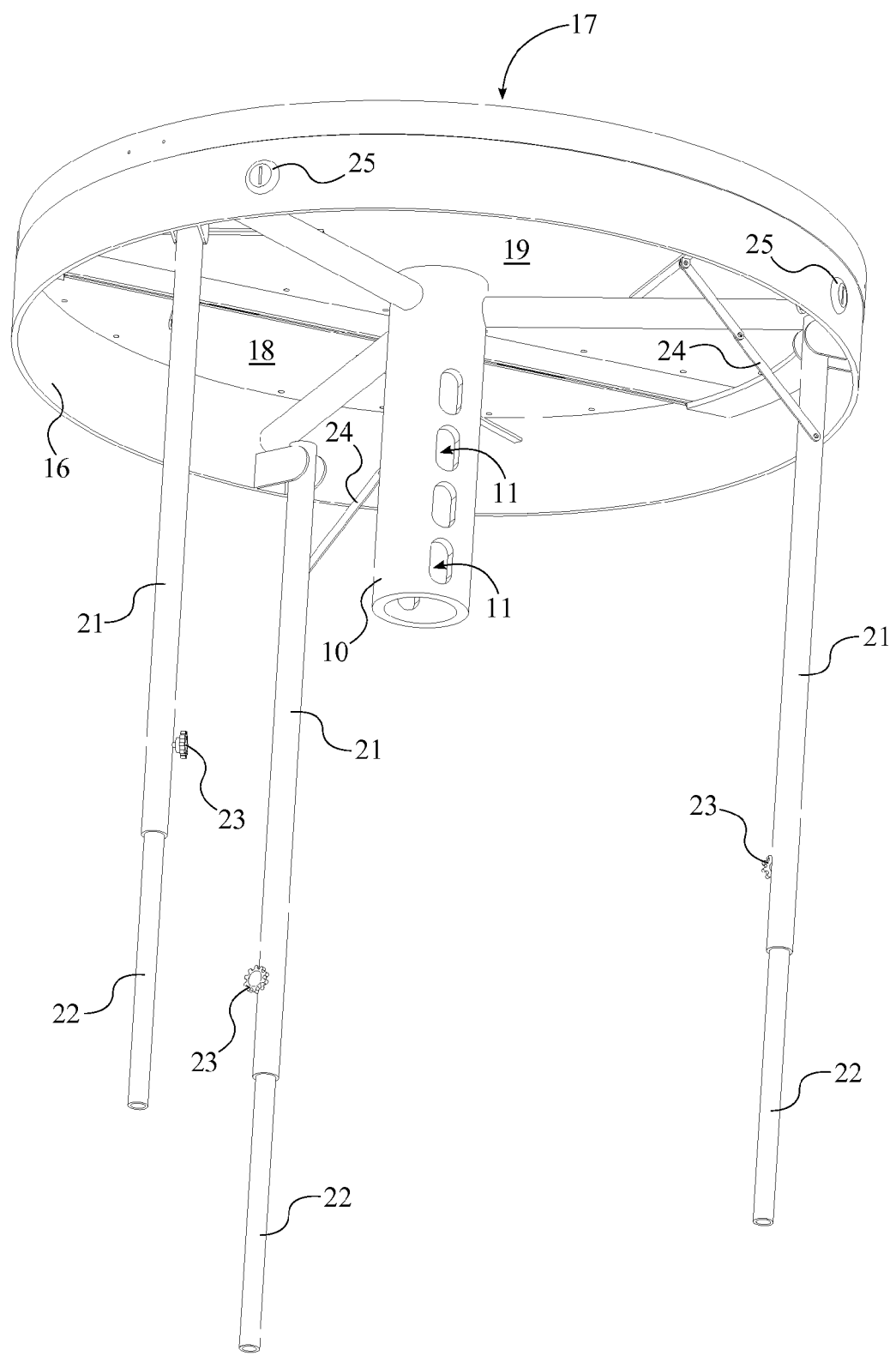
FIG. 6 is a bottom perspective view of the present invention detached from the external spare tire assembly, wherein the present invention is being used as a deployable table.

As can be seen in FIGS. 1 and 2, the present invention is an deployable table for a spare tire assembly that is externally mounted on a vehicle. The present invention has a fold-out portion 19 that can be used as a shelf while the present invention is attached to the spare tire assembly. Once the present invention is detached from the spare tire assembly, the present invention can be transformed into a fully functional table. The present invention mainly comprises an adapter mount 1 for a spare tire assembly, a dual compression clamp 6, a central hub 10, a table frame 16, a table top 17, and a plurality of foldable legs 20. The central hub 10 is an essential structural base that is used to stabilize the other components while the present invention is attached to the spare tire assembly. The table frame 16 is the underlying structure that is used to support the table top 17 and is used to connect the other components of present invention together. The table top 17 comprises a stationary portion 18 and a fold-out portion 19. The stationary portion 18 is mounted onto the table frame 16, and the fold-out portion 19 is hingedly connected to the stationary portion 18. The fold-out portion 19 can be used as the shelf while the present invention is attached to the spare tire assembly, which is illustrated in FIGS. 3 and 4. In addition, the fold-out portion 19 can be used with the stationary portion 18 to form the complete flat surface of the table top 17 while the present invention is detached from the spare tire assembly, which is illustrated in FIGS. 5 and 6. The plurality of foldable legs 20 is radially positioned around the central hub 10 so that the plurality of foldable legs 20 can evenly support the table frame 16 and the table top 17 when the present invention is detached from the spare tire assembly. In addition, each of the plurality of foldable legs 20 is hingedly connected to the table frame 16, which allows each one to fold into the table frame 16 when the present invention is attached to the spare tire assembly. The adapter mount 1 retrofits a vehicle's spare tire assembly so that the rest of the present invention can be attached to the vehicle's spare tire assembly. Moreover, the central hub 10 is detachably attached to the adapter mount 1 by the dual compression clamp 6, which uses independent mechanisms to separately secure the central hub 10 and the adapter mount 1.

Figure 7:
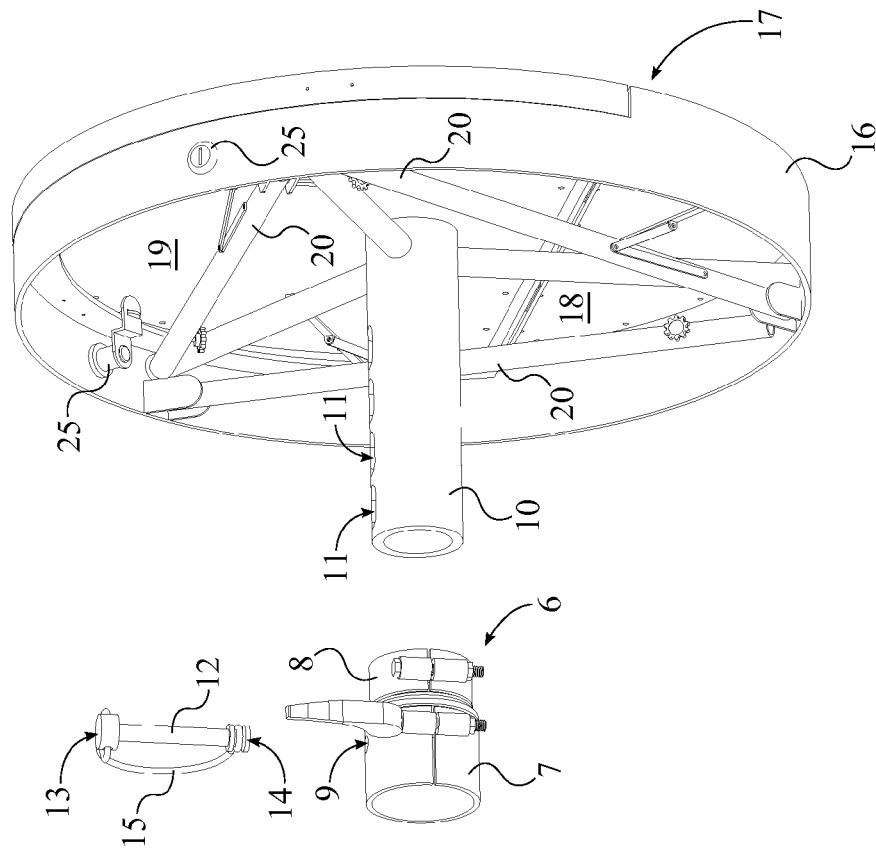
FIG. 7 is a rear exploded view of the present invention illustrating how the present invention is attached to the external spare tire assembly.
Figure 7:
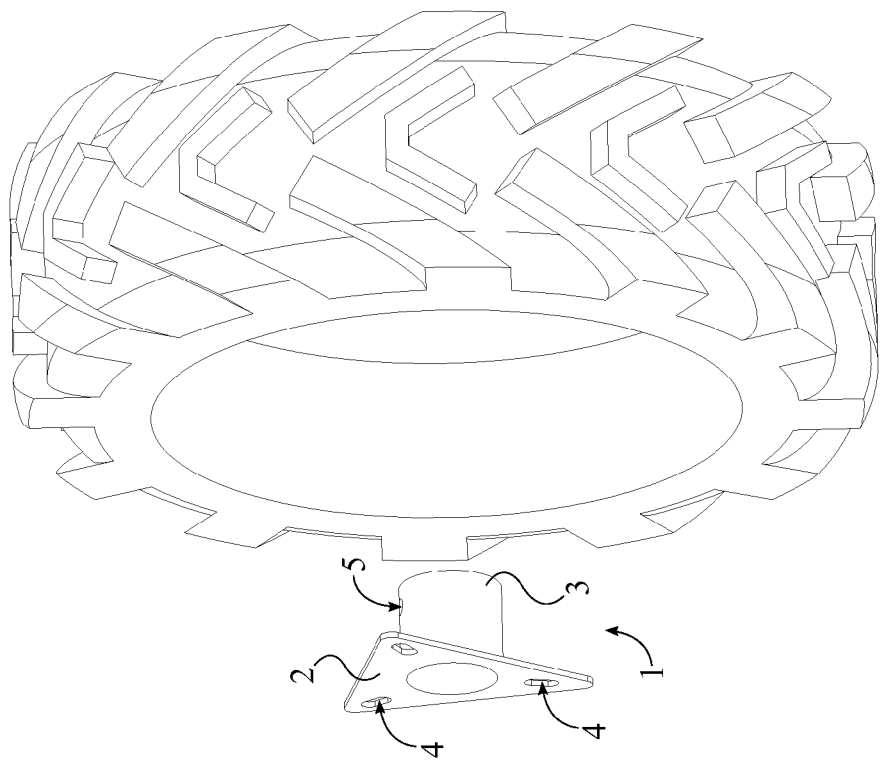
Figure 8:
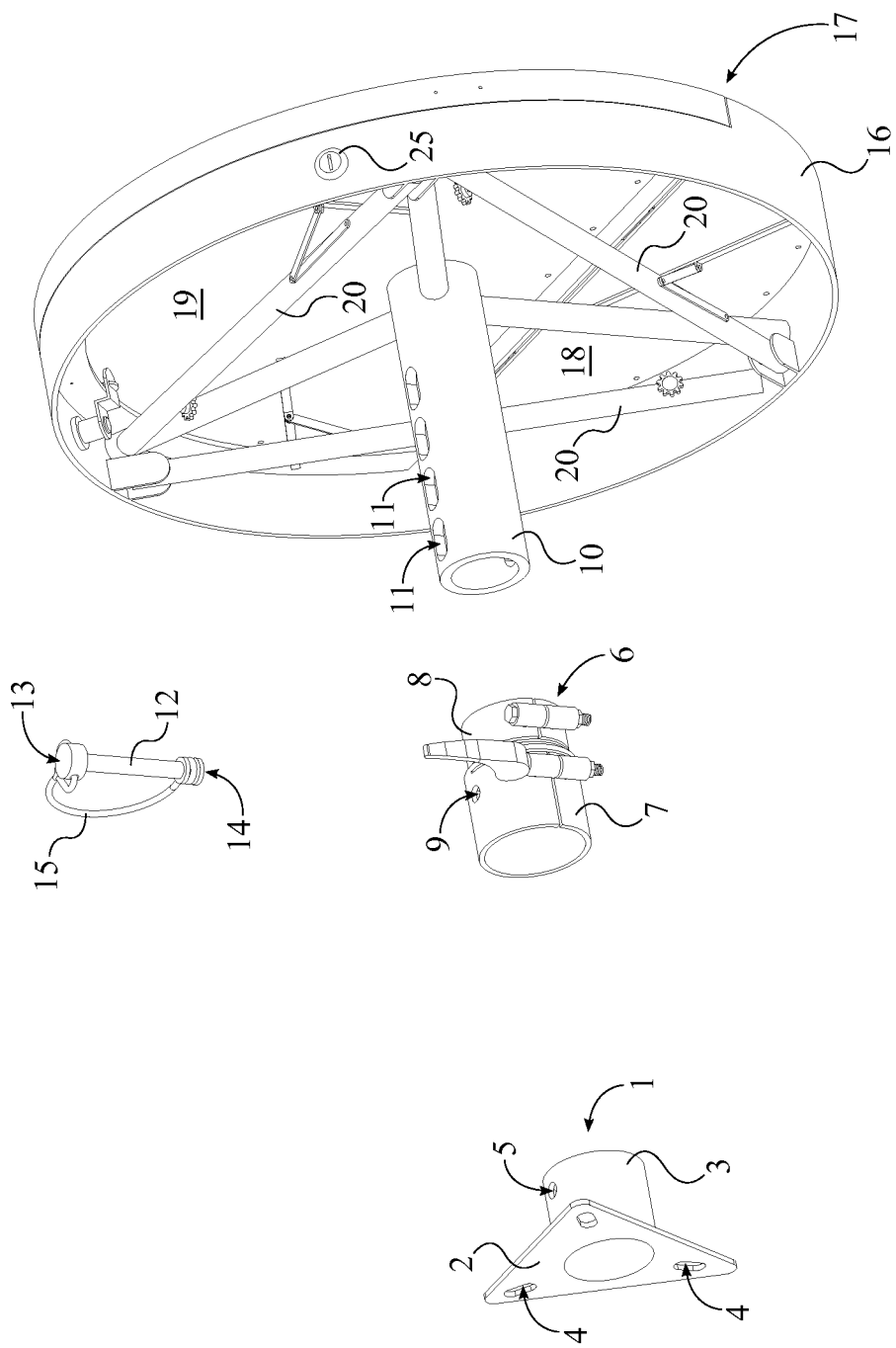
FIG. 8 is a rear exploded view of the present invention shown without the external spare tire assembly.

As can be seen in FIGS. 7 and 8, the adapter mount 1 and the dual compression clamp 6 are the key components that allow the table portions of the present invention to attach the spare tire assembly. The adapter mount 1 comprises a base plate 2, a tubular cantilever 3, a plurality of bolt holes 4, and a mount pinhole 5. The tubular cantilever 3 is connected normal to the base plate 2, which allows the base plate 2 to anchor the load carried by the tubular cantilever 3. The plurality of bolt holes 4 allows the base plate 2 to fasten onto the existing mounting bolts for the spare tire assembly. Thus, the plurality of bolt holes 4 traverses normal through the base plate 2. The positioning for the plurality of bolt holes 4 needs to match the position of the existing mounting bolts. In the preferred embodiment of the present invention, the spare tire is taken off the external framework of the spare tire assembly, and the base plate 2 is fastened onto the existing mounting bolts. The spare tire is then mounted back onto the external framework in order to sandwich the base plate 2 between the external framework and the spare tire. This configuration allows the tubular cantilever 3 to traverse through a central hole in the spare tire and, in turn, allows the rest of the present invention to be attached to the tubular cantilever 3. The mount pinhole 5 is perpendicularly traverses through the tubular cantilever 3 and is used in a connection method between the adapter mount 1, the dual compression clamp 6, and the central hub 10.

The dual compression clamp 6 allows the rest of the present invention to detachably attach to the tubular cantilever 3, which is illustrated in FIGS. 7 and 8. The dual compression clamp 6 comprises a first clamping portion 7, a second clamping portion 8, and a clamp pinhole 9. The first clamping portion 7 and the second clamping portion 8 are used to apply different clamping pressures to two differently sized objects, which are the tubular cantilever 3 and the central hub 10 in this case. In the preferred embodiment of the present invention, the first clamping portion 7 and the second clamping portion 8 function similar to a hose clamp. The first clamping portion 7 and the second clamping portion 8 are concentrically connected adjacent to each other in order to detachably attach the tubular cantilever 3 and the central hub 10 next to each other. Consequently, the tubular cantilever 3 is encircled and held in place by the first clamping portion 7, and the central hub 10 is encircled and held in place by the second clamping portion 8. The clamp pinhole 9 is perpendicularly traverses through the first clamping portion 7 and is used in the connection method between the adapter mount 1, the dual compression clamp 6, and the central hub 10. In addition, the central hub 10 traverses into and is encircled by the tubular cantilever 3 in order to further accommodate this connection method.

As can be seen in FIGS. 7 and 8, the central hub 10 needs to comprise a plurality of hub pinholes 11 instead of just one pinhole, which allows the distance between the table frame 16 and the base plate 2 to be increased or decreased depending on the thickness of the spare tire. The plurality of hub pinholes 11 perpendicularly traverses through the tubular cantilever 3 and is distributed along the central hub 10, which allows the central hub 10 to be pinned at discrete distances from the base plate 2. The present invention further comprises a pin 12 and a clevis 15. The pin 12 traverses through the mount hole, the clamp pinhole 9, and one of the plurality of hub pinholes 11 in order to complete the connection method between the adapter mount 1, the dual compression clamp 6, and the central hub 10. Once this connection method is complete, a first end 13 of the pin 12 and a second end 14 of the pin 12 need to diametrically oppose to each other about the first clamping portion 7. The clevis 15 can then be attached to both the first end 13 and the second end 14 of the pin, which holds the pin 12 in place while the clevis 15 is braced against the outer surface of the first compression portion.

Each of the plurality of foldable legs 20 is able to collapse into the table frame 16 if present invention is attached to the spare tire assembly (illustrated in FIG. 2) and is able to extend from the frame if the present invention is detached from the spare tire assembly (illustrated in FIGS. 5 and 6). Each of the plurality of foldable legs 20 comprises an outer tube 21, an inner tube 22, a height locking mechanism 23, and a hinged counterfort 24. The outer tube 21 and the inner tube 22 are the structural components for each of the plurality of foldable legs 20. The outer tube 21 is adjacently and pivotally connected to the table frame 16. The inner tube 22 traverses into the outer tube 21 and is sleeved by the outer tube 21, which allows each of the plurality of foldable legs 20 to be telescopic. The telescopic nature of the outer tube 21 and the inner tube 22 allows the height for each of the plurality of telescopic legs to be adjusted. Once the inner tube 22 is positioned into the outer tube 21 at the proper height, the outer tube 21 is affixed to the inner tube 22 by the height locking mechanism 23. In the preferred embodiment of the present invention, the height locking mechanism 23 is a male threaded knob engaged to a female threaded hole of the outer tube 21. The male threaded knob protrudes through the female threaded hole and presses against the inner tube 22 in order to lock the inner tube 22 in place. The hinged counterfort 24 is a used to reinforce the outer tube 21 and the inner tube 22 while the plurality of foldable legs 20 is extended from the table frame 16. The hinged counterfort 24 is also used to guide the outer tube 21 and the inner tube 22 into the table frame 16 in a controlled manner while the plurality of foldable legs 20 is being collapsed into the table frame 16. Consequently, the hinged counterfort 24 is pivotally connected in between the table frame 16 and the outer tube 21.

A few ancillary components are used to improve the functionality of present invention. One such ancillary component is an at least one locking latch 25, which is shown in FIG. 3. When the fold-out portion 19 is selectively oriented parallel to the stationary portion 18, the fold-out portion 19 is attached to the table frame 16 by the locking latch 25. In preferred embodiment of the present invention, the locking latch 25 utilizes a keyhole mechanism and a key to engage and disengage the locking latch 25. Also in the preferred embodiment, the present invention had two locking latches 25 that are radially positioned about the table frame 16. Another such ancillary component is an at least one adjustable strap 26, which is shown in FIG. 4. The adjustable strap 26 holds the fold-out portion 19 in an orientation perpendicular to the stationary portion 18. Consequently, the adjustable strap 26 is connected in between the table frame 16 and the fold-out portion 19. In the preferred embodiment the adjustable strap 26 is connected to the table frame 16 and the fold-out portion 19 by footman loops.

The table frame 16 and the table top 17 can be configured in any shape or size. For example, the table frame 16 can be a solid piece shaped to support the table top 17. Alternatively, the table frame 16 can have a skeleton design with a rim to support the table top 17 and with rods that are radially positioned around the central hub 10 and that connect the rim to the central hub 10. In one embodiment of the present invention, each of the foldable legs collapse into the table frame 16 and rests upon a corresponding rod when the table frame 16 has the skeleton design.

Although the invention has been explained in relation to its preferred embodiment, it is to be understood that many other possible modifications and variations can be made without departing from the spirit and scope of the invention as hereinafter claimed.

What is claimed is:
1. A deployable table for a spare tire assembly comprises:
an adapter mount;
a clamp;
a central hub;
a table frame;
a table top;
a plurality of foldable legs;
said table top comprises a stationary portion and a fold-out portion;
said central hub being connected normal to said table frame;
said plurality of foldable legs being radially positioned around said central hub;
each of said plurality of foldable legs being hingedly connected to said table frame;
said stationary portion being mounted onto said table frame;
said fold-out portion being hingedly connected to said stationary portion; and
said central hub being detachably attached to said adapter mount by the clamp.

2. The deployable table for a spare tire assembly as claimed in claim 1 comprises:
   said adapter mount comprises a base plate and a tubular cantilever;
   said clamp being a dual compression clamp;
   said dual compression clamp comprises a first clamping portion and a second clamping portion;
   said tubular cantilever being connected normal to said base plate;
   said first clamping portion and said second clamping portion being concentrically connected adjacent to each other;
   said tubular cantilever being encircled and held in place by said first clamping portion;
   said central hub being encircled and held in place by said second clamping portion; and
   said central hub traversing into and being encircled by said tubular cantilever.

3. The deployable table for a spare tire assembly as claimed in claim 2 comprises:
   said adapter mount further comprises a plurality of bolt holes; and
   said plurality of bolt holes traversing normal through the base plate.

4. The deployable table for a spare tire assembly as claimed in claim 1 comprises:
   a pin;
   said adapter mount comprises a mount pinhole;
   said dual compression clamp comprises a clamp pinhole;
   said central hub comprises a plurality of hub pinholes;
   said clamp being a dual compression clamp;
   said mount pinhole perpendicularly traversing through a tubular cantilever of said adapter mount;
   said clamp pinhole perpendicularly traversing through a first clamping portion of said dual compression clamp;
   said plurality of hub pinholes perpendicularly traversing through said central hub;
   said plurality of hub pinholes being distributed along said central hub; and
   said pin being positioned through said mount pinhole, said clamp pinhole, and one of said plurality of hub pinholes.

5. The deployable table for a spare tire assembly as claimed in claim 4 comprises:
   a clevis;
   said pin comprises a first end and a second end;
   said first end and said second end being diametrically opposed to each other about the first clamping portion;
   said clevis being attached to both said first end and said second end; and
   said clevis being braced against said first clamping portion.

6. The deployable table for a spare tire assembly as claimed in claim 1 comprises:
   each of said plurality of foldable legs comprises an outer tube, an inner tube, a hinged counterfort, and a height locking mechanism;
   said outer tube being adjacently and pivotally connected to said table frame;
   said inner tube traversing into said outer tube;
   said outer tube being affixed to said inner tube by said height locking mechanism; and
   said hinged counterfort being pivotally connected in between said table frame and said outer tube.

7. The deployable table for a spare tire assembly as claimed in claim 1 comprises:
   an at least one locking latch;
   said fold-out portion being selectively orientated parallel to said stationary portion; and
   said fold-out portion being attached to said table frame by said locking latch.

8. The deployable table for a spare tire assembly as claimed in claim 1 comprises:
   an at least one adjustable strap;
   said fold-out portion being selectively orientated perpendicular to said stationary portion; and
   said adjustable strap being connected in between said table frame and said fold-out portion.

9. The deployable table for a spare tire assembly as claimed in claim 1, wherein said adapter mount is for an external spare tire assembly.

* * * * *